(12) United States Patent
Fujiwara et al.

(10) Patent No.: US 10,354,646 B2
(45) Date of Patent: Jul. 16, 2019

(54) BILINGUAL CORPUS UPDATE METHOD, BILINGUAL CORPUS UPDATE APPARATUS, AND RECORDING MEDIUM STORING BILINGUAL CORPUS UPDATE PROGRAM

(71) Applicant: Panasonic Intellectual Property Management Co., Ltd., Osaka (JP)

(72) Inventors: Nanami Fujiwara, Nara (JP); Masaki Yamauchi, Osaka (JP); Masahiro Imade, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 175 days.

(21) Appl. No.: 15/688,934

(22) Filed: Aug. 29, 2017

(65) Prior Publication Data
US 2018/0082681 A1  Mar. 22, 2018

(30) Foreign Application Priority Data

Sep. 21, 2016  (JP) .................................. 2016-183908
May 16, 2017  (JP) .................................. 2017-097489

(51) Int. Cl.
G06F 17/28  (2006.01)
G10L 15/06  (2013.01)
G10L 15/197  (2013.01)

(52) U.S. Cl.
CPC ........ *G10L 15/197* (2013.01); *G06F 17/2818* (2013.01); *G06F 17/2827* (2013.01); *G10L 15/063* (2013.01); *G10L 2015/0636* (2013.01)

(58) Field of Classification Search
CPC . G10L 15/197; G10L 15/063; G06F 17/2818; G06F 17/2827
USPC ......................................... 704/243, 236, 2, 9
See application file for complete search history.

(56) References Cited

U.S. PATENT DOCUMENTS

| | | | | |
|---|---|---|---|---|
| 2004/0098247 A1* | 5/2004 | Moore | ................ | G06F 17/2818 704/4 |
| 2005/0102614 A1* | 5/2005 | Brockett | ............. | G06F 17/2765 715/234 |
| 2005/0256715 A1* | 11/2005 | Okimoto | ............. | G06F 17/2715 704/257 |

(Continued)

FOREIGN PATENT DOCUMENTS

| | | |
|---|---|---|
| JP | 2003-076687 | 3/2003 |
| JP | 2016-024759 | 2/2016 |

*Primary Examiner* — Akwasi M Sarpong
(74) *Attorney, Agent, or Firm* — Greenblum & Bernstein, P.L.C.

(57) ABSTRACT

A third sentence obtained by replacing a first phrase of a first sentence with a second phrase is input, and it is judged whether a third phrase is included in a first database including at least a phrase used in written text. If the third phrase is not included, a first evaluation value in the first database is calculated for a seventh phrase obtained by replacing the second phrase of the third phrase with a sixth phrase. It is judged whether the third phrase is included in a second database including at least a phrase used in spoken text and whether a second evaluation value calculated from the first evaluation value satisfies a predetermined condition. If the third phrase is included, and the second evaluation value satisfies the predetermined condition, the third sentence and the second sentence as a pair are added to a bilingual corpus.

20 Claims, 5 Drawing Sheets

(56) References Cited

U.S. PATENT DOCUMENTS

| | | | |
|---|---|---|---|
| 2006/0106604 A1* | 5/2006 | Okimoto | G10L 15/06 |
| | | | 704/243 |
| 2008/0040339 A1* | 2/2008 | Zhou | G06F 16/3334 |
| 2010/0010803 A1* | 1/2010 | Ishikawa | G06F 17/2795 |
| | | | 704/9 |
| 2016/0027433 A1 | 1/2016 | Itoh et al. | |

* cited by examiner

FIG. 2

| PARAPHRASING DB ||
|---|---|
| PRE-PARAPHRASING PHRASE | POST-PARAPHRASING PHRASE |
| 今日 /KYO (today) | きょう /KYO (today) |
| 良い /YOI (good) | いい /II (good) |
| 良い /YOI (good) | ええ /EE (good) |
| まっすぐです /MASSUGU DESU (is straight) | まっすぐ行きます /MASSUGU IKIMASU (go straight ahead) |
| まっすぐ行きます /MASSUGU IKIMASU (go straight ahead) | まっすぐです /MASSUGU DESU (is straight) |
| めっちゃ /METCHA (very) | とても /TOTEMO (very) |
| とても /TOTEMO (very) | めっちゃ /METCHA (very) |
| すごく /SUGOKU (very) | とても /TOTEMO (very) |
| とても /TOTEMO (very) | すごく /SUGOKU (very) |
| ⋮ | ⋮ |

FIG. 3

| GENERAL-PURPOSE N-GRAM DB ||
|---|---|
| EXPRESSION | OCCURRENCE FREQUENCY |
| その /SONO (that) | 6,523,000 |
| その 服 /SONO FUKU (that clothes) | 43,000 |
| その 服 とても /SONO FUKU TOTEMO (that clothes very) | 1,000 |
| あの 服 /ANO FUKU (that clothes) | 53,000 |
| あの ペン は /ANO PEN HA (that pen is) | 65,000 |
| ⋮ | ⋮ |

FIG. 4

| COLLOQUIAL EXPRESSION N-GRAM DB ||
|---|---|
| EXPRESSION | OCCURRENCE FREQUENCY |
| その 服 めっちゃ /SONO FUKU METCHA (that clothes very) | 200 |
| めっちゃ ええ な /METCHA EE NA (very good) | 10 |
| めっちゃ /METCHA (very) | 6,000 |
| ⋮ | ⋮ |

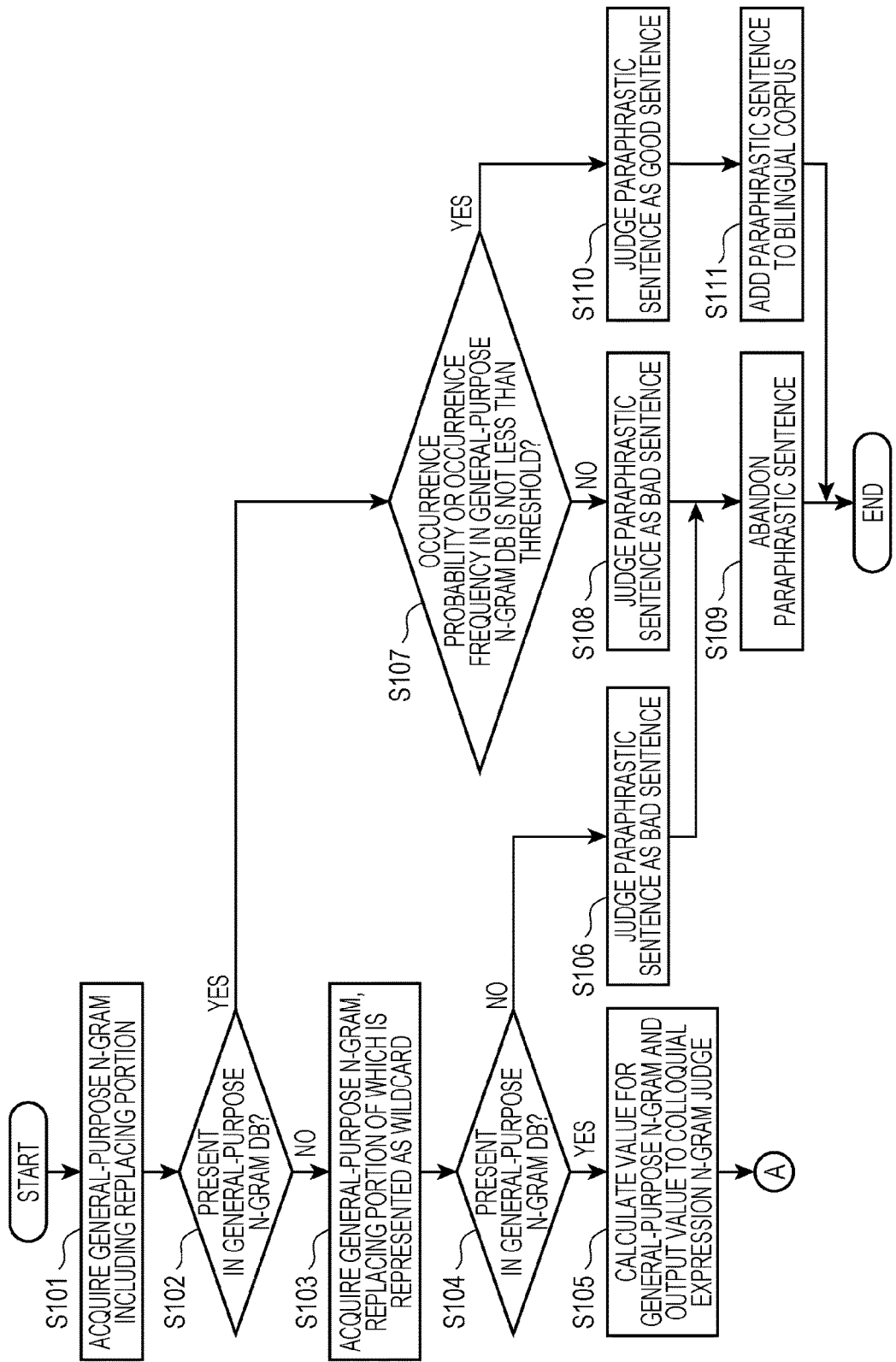

BILINGUAL CORPUS UPDATE METHOD, BILINGUAL CORPUS UPDATE APPARATUS, AND RECORDING MEDIUM STORING BILINGUAL CORPUS UPDATE PROGRAM

BACKGROUND

1. Technical Field

The present disclosure relates to a paraphrastic sentence identification method, a paraphrastic sentence identification apparatus, and a recording medium storing a paraphrastic sentence identification program for identifying whether a paraphrastic sentence created from an original sentence is good and updating a bilingual corpus.

2. Description of the Related Art

Machine translation that translates a sentence in a first language into a sentence in a second language different from the first language has been under study and development in recent years. Improvement in the performance of such machine translation needs a bilingual corpus which is a collection of a large number of illustrative sentences available for translation. To this end, one or a plurality of paraphrastic sentences similar to one original sentence are created from the original sentence. Whether paraphrastic sentences are good determines whether a bilingual corpus is good and finally determines whether translation is good.

To judge whether a paraphrastic sentence is good, for example, Japanese Patent No. 4041876 discloses a language conversion processing system for evaluating whether a sentence as a conversion result obtained after sentence replacement is good, using a plurality of evaluation scales, such as a language model (n-gram language model) and a collection of colloquial sentences.

Japanese Unexamined Patent Application Publication No. 2016-24759 discloses a method for learning a language model, versatility of which is to be expanded, by referring to a partially blanked word string in an out-of-target-field corpus which is a corpus in a field different from that of a target-field corpus, for the purpose of efficiently collecting a sentence similar to a sentence included in the target-field corpus from the out-of-target-field corpus.

SUMMARY

However, the more illustrative sentences available for translation, the more favorable to improvement in the performance of machine translation. Identification of a paraphrastic sentence usable as an illustrative sentence needs further improvement.

In one general aspect, the techniques disclosed here feature a method for updating a bilingual corpus, the bilingual corpus including a plurality of pairs, each composed of a sentence described in a first language and a translated sentence described in a second language, the bilingual corpus including a first sentence described in the first language and a second sentence described in the second language as a pair, the second sentence being a translated sentence corresponding to the first sentence, the method including: inputting a third sentence obtained by replacing a first phrase among a plurality of phrases constituting the first sentence with a second phrase; judging whether a third phrase is included in a first database, the third phrase including at least the second phrase and a fourth phrase immediately anterior to the second phrase in the third sentence or the second phrase and a fifth phrase immediately posterior to the second phrase in the third sentence, the first database including at least a phrase used in written text; calculating, on the basis of the first database, a first evaluation value in the first database for a seventh phrase obtained by replacing the second phrase of the third phrase with a sixth phrase if it is judged that the third phrase is not included in the first database, the sixth phrase being different from the second phrase; judging whether the third phrase is included in a second database and judging whether a second evaluation value calculated on the basis of the first evaluation value satisfies a predetermined condition, the second database including at least a phrase used in spoken text, the phrase used in the spoken text being associated with an occurrence frequency in the second database of the phrase used in the spoken text; and adding the third sentence and the second sentence as a pair to the bilingual corpus if it is judged that the third phrase is included in the second database and that the second evaluation value satisfies the predetermined condition.

These general and specific aspects may be implemented using a system, a method, and a computer program, and any combination of systems, methods, and computer programs.

According to the present disclosure, it is possible to efficiently and precisely identify whether a paraphrastic sentence created from an original sentence is good.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a chart showing an example of the data configuration of a paraphrasing DB shown in FIG. 1;

FIG. 3 is a chart showing an example of the data configuration of a general-purpose n-gram DB shown in FIG. 1;

FIG. 4 is a chart showing an example of the data configuration of a colloquial expression n-gram DB shown in FIG. 1;

FIG. 5 is a flowchart showing an example of general-purpose n-gram judgment processing by a general-purpose n-gram judge shown in FIG. 1.

Figure 1:
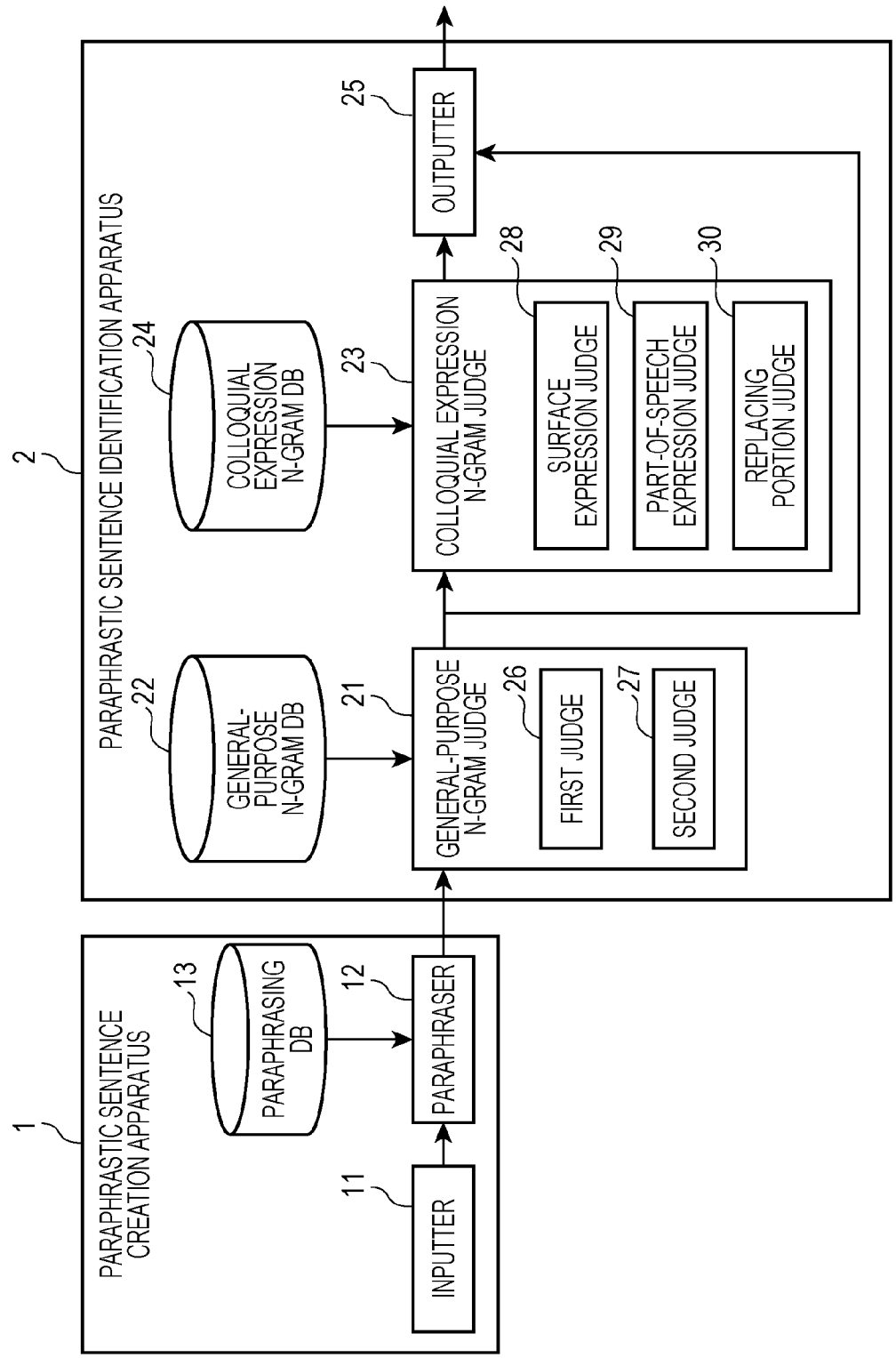
FIG. 1 is a block diagram showing an example of the configuration of a paraphrastic sentence identification system including a paraphrastic sentence identification apparatus according to an embodiment of the present disclosure.

DETAILED DESCRIPTION (Underlying Knowledge Forming Basis of the Present Disclosure)

As described above, the more illustrative sentences available for translation, the more favorable to improvement in the performance of machine translation. There is a need to efficiently and precisely judge whether a paraphrastic sentence created by paraphrasing an original sentence is good, during the process of automatically generating a corpus of translated sentences similar to an original sentence for machine translation.

However, creation of a database for a language model including many colloquial expressions involves an enormous cost. In contrast, if a database for a language model is created on the basis of pieces of information from, for example, Twitter® and Facebook®, the database has data quality less than good and includes many poor-quality data.

When whether a paraphrastic sentence is good is to be evaluated using a database for a language model (for example, a general-purpose n-gram language model), evaluation as to whether a paraphrastic sentence is good depends largely on the quality and amount of data held in the database. Especially if a phrase or the like included in a paraphrastic sentence is not included in the database or if a phrase itself near a portion replacing an original sentence is not included in the database, the paraphrastic sentence cannot be evaluated. Additionally, since the quality of a database including dialectal expressions, colloquial expressions, and the like in large numbers cannot be guaranteed, whether a paraphrastic sentence is good cannot be judged only on such databases.

In an aspect of the present disclosure, for example, if there is an n-gram including a replacing portion of a paraphrastic sentence, and the paraphrastic sentence does not wholly match the n-gram but partially matches the n-gram, an occurrence probability of only a matching portion is obtained from a general-purpose n-gram database. For example, "metcha" of the text "sono fuku metcha yoi ne" is replaced with "*" that is a wildcard, an occurrence probability of "sono fuku * yoi ne" is obtained, and a separate colloquial expression n-gram database is referred to as for the unknown word "*".

In the colloquial expression n-gram database, exact word-level matching is not performed, and part-of-speech-level matching is performed around "*". For example, "fuku" is replaced with "noun", "yoi" is replaced with "adjective", and the presence or absence of "noun metcha adjective" in the colloquial expression n-gram database is judged. As described above, in the aspect of the present disclosure, whether a paraphrastic sentence is good is judged using a language model and a colloquial expression database in combination.

As a result, in the aspect of the present disclosure, even if the amount and precision of additional data itself are not sufficient at the time of using data other than an existing language model, whether a paraphrastic sentence is good can be precisely judged. That is, whether a paraphrastic sentence is good can be judged while taking advantage of information from a large-scale, good-quality database (for example, a database for a general-purpose n-gram language model) and using a database (for example, a colloquial expression n-gram database) supporting colloquial and recent expressions in combination.

Thus, in the aspect of the present disclosure, whether a paraphrastic sentence is good can be evaluated in a hybrid manner by efficiently referring to advantages of both a large-scale, good-quality database and a database, data quality of which is not guaranteed but which includes colloquial expressions, dialectal expressions, and the like. That is, combined use of a literary expression database which has fewer grammatical errors and a colloquial expression database which has grammatical errors but includes various expressions allows efficient and precise identification of whether a paraphrastic sentence created from an original sentence is good.

The present inventors have made an earnest study on how to identify whether a paraphrastic sentence created from an original sentence is good, on the basis of the above-described underlying knowledge. As a result, the present inventors have completed the present disclosure.

(1) A method according to an aspect of the present disclosure is a method for updating a bilingual corpus, the bilingual corpus including a plurality of pairs, each composed of a sentence described in a first language and a translated sentence described in a second language, the bilingual corpus including a first sentence described in the first language and a second sentence described in the second language as a pair, the second sentence being a translated sentence corresponding to the first sentence, the method including: inputting a third sentence obtained by replacing a first phrase among a plurality of phrases constituting the first sentence with a second phrase; judging whether a third phrase is included in a first database, the third phrase including at least the second phrase and a fourth phrase immediately anterior to the second phrase in the third sentence or the second phrase and a fifth phrase immediately posterior to the second phrase in the third sentence, the first database including at least a phrase used in written text; calculating, on the basis of the first database, a first evaluation value in the first database for a seventh phrase obtained by replacing the second phrase of the third phrase with a sixth phrase if it is judged that the third phrase is not included in the first database, the sixth phrase being different from the second phrase; judging whether the third phrase is included in a second database and judging whether a second evaluation value calculated on the basis of the first evaluation value satisfies a predetermined condition, the second database including at least a phrase used in spoken text, the phrase used in the spoken text being associated with an occurrence frequency in the second database of the phrase used in the spoken text; and adding the third sentence and the second sentence as a pair to the bilingual corpus if it is judged that the third phrase is included in the second database and that the second evaluation value satisfies the predetermined condition.

With the above-described configuration, the third sentence obtained by replacing the first phrase among the plurality of phrases constituting the first sentence with the second phrase is input, whether the third phrase is included in the first database is judged, the third phrase includes at least the second phrase and the fourth phrase immediately anterior to the second phrase in the third sentence or the second phrase and the fifth phrase immediately posterior to the second phrase in the third sentence, the first database includes at least the phrase used in the written text, the first evaluation value in the first database is calculated for the seventh phrase obtained by replacing the second phrase of the third phrase with the sixth phrase on the basis of the first database if it is judged that the third phrase is not included in the first database, the sixth phrase is different from the second phrase, whether the third phrase is included in the second database and whether the second evaluation value calculated on the basis of the first evaluation value satisfies the predetermined condition are judged, the second database includes at least the phrase used in the spoken text, the phrase used in the spoken text is associated with the occurrence frequency in the second database of the phrase used in the spoken text, and the third sentence and the second sentence as the pair is added to the bilingual corpus if it is judged that the third phrase is included in the second database and that the second evaluation value satisfies the predetermined condition. It is thus possible to efficiently and precisely identify whether the third sentence that is a paraphrastic sentence created from the first sentence that is an original sentence is good.

(2) In the aspect, the third sentence may be generated by replacing the first phrase with the second phrase included in a third database, and the third database may associate a phrase with a phrase identical in meaning to and different in expression from the phrase.

With the above-described configuration, the third sentence as the paraphrastic sentence can be created from the third database.

(3) In the aspect, the second database may be generated on the basis of a phrase used in a social networking service.

With the above-described configuration, the second database is a database which includes more colloquial expressions than the first database.

(4) In the aspect, the method may further include adding the third sentence and the second sentence as the pair to the bilingual corpus if it is judged that the third phrase is included in the first database.

With the above-described configuration, whether the third sentence as the paraphrastic sentence created from the first sentence as the original sentence is good can be efficiently and precisely identified using the first database.

(5) In the aspect, the method may further include excluding the sixth phrase of the seventh phrase from judgment and judging whether the seventh phrase is present in the first database if it is judged that the third phrase is not included in the first database, and not adding the third sentence to the bilingual corpus if the seventh phrase is not present in the first database.

With the above-described configuration, the sixth phrase of the seventh phrase is excluded from judgment if it is judged that the third phrase is not included in the first database, whether the seventh phrase is present in the first database is judged, and the third sentence is not added to the bilingual corpus if the seventh phrase is not present in the first database. It is thus possible to judge, on a looser criterion of judgment, whether the third sentence as the paraphrastic sentence is good, keep only a paraphrastic sentence not satisfying the looser criterion of judgment from being added to the bilingual corpus, and further judge whether a paraphrastic sentence satisfying the looser criterion of judgment is good, on a different criterion of judgment using, for example, a database, data quality of which is not guaranteed but which includes colloquial expressions, dialectal expressions, and the like.

(6) In the aspect, the method may further include using an n-word n-gram including the second phrase as the third phrase and a database for an n-gram language model as the first database, judging whether the n-gram is present in the database for the n-gram language model, and adding the third sentence and the second sentence as the pair to the bilingual corpus if the n-gram is present in the database for the n-gram language model.

With the above-described configuration, the paraphrastic sentence (the third sentence) and the translated sentence (the second sentence) as a pair are added to the bilingual corpus if the n-gram that is a judgment object portion is present in the database for the n-gram language model. It is thus possible to add more paraphrastic sentences to the bilingual corpus.

(7) In the aspect, the method further includes using an n-word n-gram including the second phrase as the third phrase and a database for an n-gram language model as the first database, obtaining an occurrence probability or an occurrence frequency of the n-gram from the database for the n-gram language model, and adding the third sentence and the second sentence as the pair to the bilingual corpus if a third evaluation value calculated from the occurrence probability or the occurrence frequency of the n-gram is not less than a predetermined threshold.

With the above-described configuration, it is judged that the paraphrastic sentence (the third sentence) and the translated sentence (the second sentence) as the pair is to be added to the bilingual corpus if the third evaluation value calculated from the occurrence probability or the occurrence frequency of the n-gram as the judgment object portion is not less than the predetermined threshold. It is thus possible to precisely judge whether the paraphrastic sentence is good and add the paraphrastic sentence and the translated sentence as the pair to the bilingual corpus.

(8) In the aspect, the method may further include judging whether the n-gram, the second phrase of which is excluded from judgment, is present in the database for the n-gram language model if it is judged that the third phrase is not included in the first database, and not adding the third sentence to the bilingual corpus if the n-gram, the second phrase of which is excluded from judgment, is not present in the database for the n-gram language model.

With the above-described configuration, the paraphrastic sentence (the third sentence) is not added to the bilingual corpus if the n-gram, a replacing portion (the second phrase) of which is excluded from judgment, is not present in the database for the n-gram language model. It is thus possible to keep only a paraphrastic sentence not satisfying the criterion of judgment looser than a criterion of judgment for the normal n-gram language model from being added to the bilingual corpus and efficiently and precisely judge, on a different criterion of judgment, whether a paraphrastic sentence satisfying the criterion of judgment looser than the criterion of judgment for the normal n-gram language model is good.

(9) In the aspect, the method may further include obtaining an occurrence probability or an occurrence frequency of the n-gram, the second phrase of which is excluded from judgment, from the database for the n-gram language model if it is judged that the third phrase is not included in the first database, and not adding the third sentence to the bilingual corpus if a fourth evaluation value calculated from the occurrence probability or the occurrence frequency of the n-gram, the second phrase of which is excluded from judgment, is less than a predetermined threshold.

With the above-described configuration, the paraphrastic sentence (the third sentence) is not added to the bilingual corpus if the fourth evaluation value calculated from the occurrence probability or the occurrence frequency of the n-gram, the replacing portion (the second phrase) of which is excluded from judgment, is less than the predetermined threshold. It is thus possible to precisely judge that the paraphrastic sentence is bad, on the evaluation value, a criterion of judgment for which is looser than the criterion of judgment of the normal n-gram language model and which is calculated from the occurrence probability or the occurrence frequency of the n-gram, and efficiently and precisely judge, on a different criterion of judgment, whether a paraphrastic sentence satisfying the evaluation value, the criterion of judgment for which is looser than the criterion of judgment of the normal n-gram language model and which is calculated from the occurrence probability or the occurrence frequency of the n-gram, is good.

(10) In the aspect, the method may further include judging whether a surface expression anterior and posterior portion composed of the second phrase, the fourth phrase, and the fifth phrase of the n-gram is present in the second database if the seventh phrase is present in the first database, and adding the third sentence and the second sentence as the pair to the bilingual corpus if the surface expression anterior and posterior portion is present in the second database, and a surface expression anterior- and posterior-side evaluation value calculated from an occurrence probability or an occurrence frequency of the n-gram, the second phrase of which is excluded from judgment, is not less than a predetermined threshold.

With the above-described configuration, the paraphrastic sentence (the third sentence) and the translated sentence (the second sentence) as the pair is added to the bilingual corpus if the surface expression anterior and posterior portion composed of the replacing portion (the second phrase) and words (the fourth and fifth phrases) anterior and posterior to the replacing portion is present in the second database, and the surface expression anterior- and posterior-side evaluation value calculated from the occurrence probability or the occurrence frequency of the n-gram, the replacing portion (the second phrase) of which is excluded from judgment, is not less than the predetermined threshold. It is thus possible to efficiently and precisely judge whether the paraphrastic sentence is good, on the basis of the surface expression anterior and posterior portion composed of the replacing portion and the words anterior and posterior to the replacing portion, and add the paraphrastic sentence and the translated sentence as the pair to the bilingual corpus even if the amount and precision of data in the second database are not sufficient.

(11) In the aspect, the method may further include judging whether a surface expression anterior word portion composed of the second phrase and the fourth phrase of the n-gram or a surface expression posterior word portion composed of the second phrase and the fifth phrase is present in the second database if the seventh phrase is present in the first database, and adding the third sentence and the second sentence as the pair to the bilingual corpus if the surface expression anterior word portion or the surface expression posterior word portion is present in the second database, and a surface expression one-side evaluation value calculated from the occurrence probability or the occurrence frequency of the n-gram, the second phase of which is excluded from judgment, is not less than a predetermined threshold.

With the above-described configuration, the paraphrastic sentence (the third sentence) and the translated sentence (the second sentence) as the pair are added to the bilingual corpus if the surface expression anterior word portion composed of the anterior word (the fourth phrase) and the replacing portion (the second phrase) or the surface expression posterior word portion composed of the replacing portion (the second phrase) and the posterior word (the fifth phrase) is present in the second database, and the surface expression one-side evaluation value calculated from the occurrence probability or the occurrence frequency of the n-gram, the replacing portion (the second phrase) of which is excluded from judgment, is not less than the predetermined threshold. It is thus possible to efficiently and precisely judge whether the paraphrastic sentence is good, on the basis of the surface expression anterior word portion composed of the anterior word and the replacing portion or the surface expression posterior word portion composed of the replacing portion and the posterior word, and add the paraphrastic sentence and the translated sentence as the pair to the bilingual corpus even if the amount and precision of data in the second database are not sufficient.

(12) In the aspect, the surface expression anterior- and posterior-side evaluation value may be a value obtained by multiplying the first evaluation value obtained from the occurrence probability or the occurrence frequency of the n-gram, the second phrase of which is excluded from judgment, by a predetermined first weighting factor, and the surface expression one-side evaluation value may be a value obtained by multiplying the first evaluation value by a second weighting factor less than the first weighting factor.

With the above-described configuration, whether the paraphrastic sentence is good can be more precisely judged on the basis of the surface expression anterior and posterior portion composed of the replacing portion and the anterior and posterior words, and the surface expression anterior word portion composed of the replacing portion and the anterior word or the surface expression posterior word portion composed of the replacing portion and the posterior word.

(13) In the aspect, the method may further include judging whether a part-of-speech expression anterior and posterior portion composed of the second phrase of the n-gram, an anterior part-of-speech portion obtained by replacing the fourth phrase with a part of speech of the fourth phrase, and a posterior part-of-speech portion obtained by replacing the fifth phrase with a part of speech of the fifth phrase is present in the second database if the surface expression anterior and posterior portion is not present in the second database, if the surface expression anterior- and posterior-side evaluation value is less than the predetermined threshold, if neither the surface expression anterior word portion nor the surface expression posterior word portion is present in the second database, or if the surface expression one-side evaluation value is less than the predetermined threshold, and adding the third sentence and the second sentence as the pair to the bilingual corpus if the part-of-speech expression anterior and posterior portion is present in the second database, and a part-of-speech expression anterior- and posterior-side evaluation value calculated from the occurrence probability or the occurrence frequency of the n-gram, the second phrase of which is excluded from judgment, is not less than a predetermined threshold.

With the above-described configuration, the paraphrastic sentence (the third sentence) and the translated sentence (the second sentence) as the pair is added to the bilingual corpus if the part-of-speech expression anterior and posterior portion composed of the anterior part-of-speech portion, the replacing portion (the second phrase), and the posterior part-of-speech portion is present in the second database, and the part-of-speech expression anterior- and posterior-side evaluation value calculated from the occurrence probability or the occurrence frequency of the n-gram, the replacing portion (the second phrase) of which is excluded from judgment, is not less than the predetermined threshold. It is thus possible to efficiently and precisely judge whether the paraphrastic sentence is good, on the basis of the part-of-speech expression anterior and posterior portion composed of the anterior part-of-speech portion, the replacing portion, and the posterior part-of-speech portion, even if the amount and precision of data in the second database are not sufficient.

(14) In the aspect, the method may further include judging whether a part-of-speech expression anterior word portion composed of the second phrase of the n-gram and the anterior part-of-speech portion obtained by replacing the fourth phrase with the part of speech of the fourth phrase or a part-of-speech expression posterior word portion composed of the second phrase and the posterior part-of-speech portion obtained by replacing the fifth phrase with the part of speech of the fifth phrase is present in the second database if the surface expression anterior and posterior portion is not present in the second database, if the surface expression anterior- and posterior-side evaluation value is less than the predetermined threshold, if neither the surface expression anterior word portion nor the surface expression posterior word portion is present in the second database, or if the surface expression one-side evaluation value is less than the predetermined threshold, and adding the third sentence and the second sentence as the pair to the bilingual corpus if the part-of-speech expression anterior word portion or the part-of-speech expression posterior word portion is present in the second database, and a part-of-speech expression one-side evaluation value calculated from the occurrence probability or the occurrence frequency of the n-gram, the replacing portion of which is excluded from judgment, is not less than a predetermined threshold.

With the above-described configuration, the paraphrastic sentence (the third sentence) and the translated sentence (the second sentence) as the pair are added to the bilingual corpus if the part-of-speech expression anterior word portion composed of the anterior part-of-speech portion and the replacing portion (the second phrase) or the part-of-speech expression posterior word portion composed of the replacing portion (the second phrase) and the posterior part-of-speech portion is present in the second database, and the part-of-speech expression one-side evaluation value calculated from the occurrence probability or the occurrence frequency of the n-gram, the replacing portion (the second phrase) of which is excluded from judgment, is not less than the predetermined threshold. It is thus possible to efficiently and precisely judge whether the paraphrastic sentence is good, on the basis of the part-of-speech expression anterior word portion composed of the anterior part-of-speech portion and the replacing portion or the part-of-speech expression posterior word portion composed of the replacing portion and the posterior part-of-speech portion even if the amount and precision of data in the second database are not sufficient.

(15) In the aspect, the surface expression anterior- and posterior-side evaluation value may be a value obtained by multiplying the first evaluation value obtained from the occurrence probability or the occurrence frequency of the n-gram, the second phrase of which is excluded from judgment, by a predetermined first weighting factor, the surface expression one-side evaluation value may be a value obtained by multiplying the first evaluation value by a second weighting factor less than the first weighting factor, the part-of-speech expression anterior- and posterior-side evaluation value may be a value obtained by multiplying the first evaluation value by a third weighting factor less than the second weighting factor, and the part-of-speech expression one-side evaluation value may be a value obtained by multiplying the first evaluation value by a fourth weighting factor less than the third weighting factor.

With the above-described configuration, whether the paraphrastic sentence is good can be more precisely judged, on the basis of the surface expression anterior and posterior portion composed of the replacing portion (the second phrase) and the anterior and posterior words, the surface expression anterior word portion composed of the anterior word and the replacing portion (the second phrase) or the surface expression posterior word portion composed of the replacing portion (the second phrase) and the posterior word, the part-of-speech expression anterior and posterior portion composed of the anterior part-of-speech portion, the replacing portion (the second phrase), and the posterior part-of-speech portion, and the part-of-speech expression anterior word portion composed of the anterior part-of-speech portion and the replacing portion (the second phrase) or the part-of-speech expression posterior word portion composed of the replacing portion (the second phrase) and the posterior part-of-speech portion.

(16) In the aspect, the method may further include judging whether the second phrase is present in the second database if the part-of-speech expression anterior and posterior portion is not present in the second database, if the part-of-speech expression anterior- and posterior-side evaluation value is less than the predetermined threshold, if neither the part-of-speech expression anterior word portion nor the part-of-speech expression posterior word portion is present in the second database, or if the part-of-speech expression one-side evaluation value is less than the predetermined threshold, and adding the third sentence and the second sentence as the pair to the bilingual corpus if the second phrase is present in the second database, and a replacing portion evaluation value calculated from the occurrence probability or the occurrence frequency of the n-gram, the second phrase of which is excluded from judgment, is not less than a predetermined threshold.

With the above-described configuration, the paraphrastic sentence (the third sentence) and the translated sentence (the second sentence) as the pair are added to the bilingual corpus if the replacing portion (the second phrase) is present in the second database, and the replacing portion evaluation value calculated from the occurrence probability or the occurrence frequency of the n-gram, the replacing portion (the second phrase) of which is excluded from judgment, is not less than the predetermined threshold. It is thus possible to efficiently and precisely judge whether the paraphrastic sentence is good, on the basis of the replacing portion even if the amount and precision of data in the second database are not sufficient.

(17) In the aspect, the surface expression anterior- and posterior-side evaluation value may be a value obtained by multiplying the first evaluation value obtained from the occurrence probability or the occurrence frequency of the n-gram, the second phrase of which is excluded from judgment, by a predetermined first weighting factor, the surface expression one-side evaluation value may be a value obtained by multiplying the first evaluation value by a second weighting factor less than the first weighting factor, the part-of-speech expression anterior- and posterior-side evaluation value may be a value obtained by multiplying the first evaluation value by a third weighting factor less than the second weighting factor, the part-of-speech expression one-side evaluation value may be a value obtained by multiplying the first evaluation value by a fourth weighting factor less than the third weighting factor, and the replacing portion evaluation value may be a value obtained by multiplying the first evaluation value by a fifth weighting factor less than the fourth weighting factor.

With the above-described configuration, whether the paraphrastic sentence is good can be more precisely judged on the basis of the surface expression anterior and posterior portion composed of the replacing portion (the second phrase) and the anterior and posterior words, the surface expression anterior word portion composed of the anterior word and the replacing portion (the second phrase) or the surface expression posterior word portion composed of the replacing portion (the second phrase) and the posterior word, the part-of-speech expression anterior and posterior portion composed of the anterior part-of-speech portion, the replacing portion (the second phrase), and the posterior part-of-speech portion, the part-of-speech expression anterior word portion composed of the anterior part-of-speech portion and the replacing portion (the second phrase) or the part-of-speech expression posterior word portion composed of the replacing portion (the second phrase) and the posterior part-of-speech portion, and the replacing portion (the second phrase).

(18) In the aspect, the second database may be a database which includes more colloquial expressions than the database for the n-gram language model.

With the above-described configuration, the literal expression database for the n-gram language model that has less grammatical errors and the second colloquial expression database that has grammatical errors but includes various expressions are used in combination. This allows efficient and precise identification of whether the paraphrastic sentence created from the original sentence is good.

The present disclosure can be implemented not only as a paraphrastic sentence identification method for executing the above-described characteristic processes but also as a paraphrastic sentence identification apparatus or the like including a characteristic configuration corresponding to the characteristic processes to be executed by the paraphrastic sentence identification method. The present disclosure can also be implemented as a recording medium storing a computer program for causing a computer to execute the characteristic processes included in the paraphrastic sentence identification method. Thus, the other aspects below can also produce the same effects as those of the paraphrastic sentence identification method.

An apparatus according to another aspect of the present disclosure is an apparatus for updating a bilingual corpus, the bilingual corpus including a plurality of pairs, each composed of a sentence described in a first language and a translated sentence described in a second language, the bilingual corpus including a first sentence described in the first language and a second sentence described in the second language as a pair, the second sentence being a translated sentence corresponding to the first sentence, the apparatus including: an inputter which inputs a third sentence obtained by replacing a first phrase among a plurality of phrases constituting the first sentence with a second phrase; a first database judge which judges whether a third phrase is included in a first database, the third phrase including at least the second phrase and a fourth phrase immediately anterior to the second phrase in the third sentence or the second phrase and a fifth phrase immediately posterior to the second phrase in the third sentence, the first database including at least a phrase used in written text; a calculator which calculates, on the basis of the first database, a first evaluation value in the first database for a seventh phrase obtained by replacing the second phrase of the third phrase with a sixth phrase if it is judged that the third phrase is not included in the first database, the sixth phrase being different from the second phrase; a second database judge which judges whether the third phrase is included in a second database and judges whether a second evaluation value calculated on the basis of the first evaluation value satisfies a predetermined condition, the second database including at least a phrase used in spoken text, the phrase used in the spoken text being associated with an occurrence frequency in the second database of the phrase used in the spoken text; and an outputter which adds the third sentence and the second sentence as a pair to the bilingual corpus if it is judged that the third phrase is included in the second database and that the second evaluation value satisfies the predetermined condition.

A recording medium storing a program according to another aspect of the present disclosure is a recording medium storing a program for causing a computer to function as an apparatus for updating a bilingual corpus, the bilingual corpus including a plurality of pairs, each composed of a sentence described in a first language and a translated sentence described in a second language, the bilingual corpus including a first sentence described in the first language and a second sentence described in the second language as a pair, the second sentence being a translated sentence corresponding to the first sentence, the program causing the computer to execute: inputting a third sentence obtained by replacing a first phrase among a plurality of phrases constituting the first sentence with a second phrase; judging whether a third phrase is included in a first database, the third phrase including at least the second phrase and a fourth phrase immediately anterior to the second phrase in the third sentence or the second phrase and a fifth phrase immediately posterior to the second phrase in the third sentence, the first database including at least a phrase used in written text; calculating, on the basis of the first database, a first evaluation value in the first database for a seventh phrase obtained by replacing the second phrase of the third phrase with a sixth phrase if it is judged that the third phrase is not included in the first database, the sixth phrase being different from the second phrase; judging whether the third phrase is included in a second database and judging whether a second evaluation value calculated on the basis of the first evaluation value satisfies a predetermined condition, the second database including at least a phrase used in spoken text, the phrase used in the spoken text being associated with an occurrence frequency in the second database of the phrase used in the spoken text; and adding the third sentence and the second sentence as a pair to the bilingual corpus if it is judged that the third phrase is included in the second database and that the second evaluation value satisfies the predetermined condition.

Of course, the above-described computer program can be distributed via a computer-readable non-transitory recording medium, such as a CD-ROM, or a communication network, such as the Internet.

A system may be constructed in which some of constituent elements of a paraphrastic sentence identification apparatus according to an embodiment of the present disclosure and the other constituent elements are distributed among a plurality of computers.

Note that the embodiment to be described below is intended to illustrate a specific example of the present disclosure. Numerical values, shapes, constituent elements, steps, the order of the steps, and the like in the embodiment described below are merely illustrative and are not intended to limit the present disclosure. Among constituent elements in the embodiment below, those not set forth in an independent claim representing a top-level concept will be described as optional constituent elements. Features of all embodiments can also be combined.

EMBODIMENT

An embodiment of the present disclosure will be described below with reference to the drawings. FIG. 1 is a block diagram showing an example of the configuration of a paraphrastic sentence identification system including a paraphrastic sentence identification apparatus according to the embodiment of the present disclosure. The paraphrastic sentence identification system shown in FIG. 1 includes a paraphrastic sentence creation apparatus 1 and a paraphrastic sentence identification apparatus 2.

The paraphrastic sentence creation apparatus 1 includes an inputter 11, a paraphraser 12, and a paraphrasing database (DB) 13. The paraphrastic sentence creation apparatus 1 creates, from one original sentence, one or a plurality of paraphrastic sentences similar to (synonymous with) the original sentence by paraphrasing a part or the whole of the original sentence in accordance with a predetermined rule set in advance and outputs the created paraphrastic sentences to the paraphrastic sentence identification apparatus 2.

The inputter 11 accepts a predetermined operational input from a user and outputs an original sentence input by the user to the paraphraser 12. The paraphrasing DB 13 is a database which associates a first fragment (a first phrase) and a second fragment (a second phrase) obtained by differently expressing the first fragment with each other in accordance with various rules and stores a plurality of pairs of first and second fragments. For example, a database of synonymous words and similar words collected from a predetermined Web site on the Internet, which is not so good in data quality but is large in data amount, can be used as the paraphrasing DB 13.

FIG. 2 is a chart showing an example of the data configuration of the paraphrasing DB 13 shown in FIG. 1. As shown in FIG. 2, a pre-paraphrasing phrase and a post-paraphrasing phrase are held in the paraphrasing DB 13. For example, the post-paraphrasing phrase "ii" is associated with the pre-paraphrasing phrase "yoi" and is stored. As described above, the paraphrasing DB 13 is an example of a third database and associates a phrase with a phrase identical in meaning to and different in expression from the phrase.

The paraphraser 12 refers to the paraphrasing DB 13, creates one or a plurality of paraphrastic sentences by paraphrasing (replacing) one or a plurality of fragments among a plurality of fragments, into which an original sentence is divided in accordance with a predetermined rule set in advance, into (with) a different expression, that is, replacing a replaced portion of the original sentence with a word or a phrase similar in meaning, and outputs the created paraphrastic sentences to the paraphrastic sentence identification apparatus 2. As described above, a paraphrastic sentence (a third sentence) is generated by replacing a replaced portion (a first phrase) of an original sentence with a replacing portion (a second phrase) included in the paraphrasing DB 13 (the third database).

Note that various conventional paraphrastic sentence creation methods can be used as a method for creating the above-described paraphrastic sentence. In the present embodiment, a paraphrastic sentence can be created by, for example, dividing an original sentence on a part-of-speech basis to create a plurality of words, each belonging to a part of speech, and transcribing one word belonging to a part of speech in the original sentence into a word in a different expression.

The paraphrastic sentence identification apparatus 2 includes a general-purpose n-gram judge 21, a general-purpose n-gram database (DB) 22, a colloquial expression n-gram judge 23, a colloquial expression n-gram database (DB) 24, and an outputter 25. The paraphrastic sentence identification apparatus 2 identifies whether a paraphrastic sentence created by the paraphrastic sentence creation apparatus 1 is good and outputs an identification result. The paraphrastic sentence identification apparatus 2 is an apparatus which updates a bilingual corpus (not shown). The bilingual corpus includes a plurality of pairs, each composed of a sentence described in a first language (for example, Japanese) and a translated sentence described in a second language (for example, English). That is, the bilingual corpus includes an original sentence (a first sentence) described in the first language and a translated sentence (a second sentence) described in the second language as a pair, and the second sentence is a translated sentence corresponding to the first sentence.

The general-purpose n-gram DB 22 is a general-purpose database for a large-scale, good-quality n-gram language model. The n-gram language model here refers to a probabilistic language model obtained by modelizing the "likelihood of being a phrase" used by a human as a probability. For example, if the text S1 "kyo no yushoku ha kare desu" and the text S2 "kyo no yushoku ha yakyu desu" are present, it can be said that the text S1 is more likely to occur as a Japanese sentence. An occurrence probability of the text S1 acquired from a general-purpose database for an n-gram language model is higher than that of the text S2.

FIG. 3 is a chart showing an example of the data configuration of the general-purpose n-gram DB 22 shown in FIG. 1. As shown in FIG. 3, words with a space between adjacent words as an expression and an occurrence frequency of the words are held in the general-purpose n-gram DB 22. For example, FIG. 3 indicates that the expression "sono fuku totemo" occurs 1,000 times in the database. For example, an occurrence probability can be obtained on the basis of the occurrence frequency.

As described above, the general-purpose n-gram DB 22 is an example of a first database, includes at least a phrase used in written text, and associates a phrase used in written text with an occurrence frequency in the general-purpose n-gram DB 22 of the phrase used in the written text.

The general-purpose n-gram judge 21 receives an input paraphrastic sentence created by the paraphrastic sentence creation apparatus 1, acquires an occurrence probability or an occurrence frequency of a phrase including a replacing portion of the paraphrastic sentence from the general-purpose n-gram DB 22 to judge whether the paraphrastic sentence is good, and outputs a judgment result and the like to the colloquial expression n-gram judge 23 and the outputter 25. The general-purpose n-gram judge 21 includes a first judge 26 and a second judge 27.

The first judge 26 judges whether a judgment object portion including a replacing portion of a paraphrastic sentence, with which an original sentence has been replaced, and at least one of a portion anterior to and a portion posterior to the replacing portion is present in the general-purpose n-gram DB 22, judges on a judgment result whether the paraphrastic sentence is good, and outputs a judgment result to the second judge 27 and the outputter 25.

More specifically, the first judge 26 uses n-word n-grams including the replacing portions as judgment object portions and judges, using the general-purpose n-gram DB 22, whether any of the n-grams is present in the general-purpose n-gram DB 22. If any of the n-grams is present in the general-purpose n-gram DB 22, the first judge 26 judges that the paraphrastic sentence is good and outputs a judgment result to the outputter 25. On the other hand, if none of the n-grams is present in the general-purpose n-gram DB 22, the first judge 26 outputs a judgment result to the second judge 27.

Note that a criterion of judgment in the first judge 26 is not particularly limited to the above-described example. An occurrence probability or an occurrence frequency of each of the n-grams may be obtained from the general-purpose n-gram DB 22, and the paraphrastic sentence may be judged as good if an evaluation value calculated from the occurrence probabilities or the occurrence frequencies of the n-grams is not less than a predetermined threshold.

If the first judge 26 fails to judge that the paraphrastic sentence is good (if none of the n-grams is present in the general-purpose n-gram DB 22), the second judge 27 judges whether any of the n-grams, the replacing portions of which are excluded from judgment, is present in the general-purpose n-gram DB 22. If none of the n-grams, the replacing portions of which are excluded from judgment, is present in the general-purpose n-gram DB 22, the second judge 27 judges that the paraphrastic sentence is bad and outputs a judgment result to the outputter 25. On the other hand, if any of the judgment object portions, the replacing portions of which are excluded from judgment, is present in the general-purpose n-gram DB 22, the second judge 27 acquires an occurrence probability or an occurrence frequency of each of the n-grams, the replacing portions of which are excluded from judgment, from the general-purpose n-gram DB 22 and outputs a non-judgment-object evaluation value which is obtained from the occurrence probabilities or the occurrence frequencies of the n-grams, the replacing portions of which are excluded from judgment, to the colloquial expression n-gram judge 23.

Note that a criterion of judgment in the second judge 27 is not particularly limited to the above-described example. If the first judge 26 fails to judge that the paraphrastic sentence is good, the second judge 27 may obtain the occurrence probability or the occurrence frequency of each of the n-grams, the replacing portions of which are excluded from judgment, from the general-purpose n-gram DB 22. If the evaluation value calculated from the occurrence probabilities or the occurrence frequencies of the n-grams, the replacing portions of which are excluded from judgment, is less than a predetermined threshold, the second judge 27 may judge that the paraphrastic sentence is bad. On the other hand, if the evaluation value is not less than the predetermined threshold, the second judge 27 may judge that the paraphrastic sentence is good.

The colloquial expression n-gram DB 24 is a colloquial expression database for an n-gram language model which is created on the basis of pieces of information from Twitter®, Facebook®, and the like, includes colloquial expressions, dialectal expressions, and the like in large numbers, and is not necessarily good in quality.

FIG. 4 is a chart showing an example of the data configuration of the colloquial expression n-gram DB 24 shown in FIG. 1. As shown in FIG. 4, words with a space between adjacent words as an expression and an occurrence frequency of the words are held in the colloquial expression n-gram DB 24. For example, FIG. 4 indicates that the expression "sono fuku metcha" occurs 200 times in the database. For example, an occurrence probability can be obtained on the basis of the occurrence frequency.

As described above, the colloquial expression n-gram DB 24 is an example of a second database. The colloquial expression n-gram DB 24 is generated on the basis of phrases used in a social networking service (SNS), includes at least a phrase used in spoken text, and associates a phrase used in spoken text with an occurrence frequency in the colloquial expression n-gram DB 24 of the phrase used in the spoken text.

The colloquial expression n-gram judge 23 acquires information from the colloquial expression n-gram DB 24 for a phrase including a replacing portion, judges whether a paraphrastic sentence is good, using the information together with information from the general-purpose n-gram judge 21, and outputs a judgment result to the outputter 25. The colloquial expression n-gram judge 23 includes a surface expression judge 28, a part-of-speech expression judge 29, and a replacing portion judge 30.

If the second judge 27 fails to judge that a paraphrastic sentence is bad, the surface expression judge 28 judges whether a surface expression anterior and posterior portion composed of a replacing portion and words anterior and posterior to the replacing portion in n-grams is present in the colloquial expression n-gram DB 24. If the surface expression anterior and posterior portion is present in the colloquial expression n-gram DB 24, and a surface expression anterior- and posterior-side evaluation value which is calculated from occurrence probabilities or occurrence frequencies of the n-grams, the replacing portions of which are excluded from judgment, is not less than a predetermined threshold, the surface expression judge 28 judges that the paraphrastic sentence is good and outputs a judgment result to the outputter 25.

If the second judge 27 fails to judge that the paraphrastic sentence is bad, the surface expression judge 28 also judges whether a surface expression anterior word portion composed of the replacing portion and the word anterior to the replacing portion in the n-grams or a surface expression posterior word portion composed of the replacing portion and the word posterior to the replacing portion in the n-grams is present in the colloquial expression n-gram DB 24. If the surface expression anterior word portion or the surface expression posterior word portion is present in the colloquial expression n-gram DB 24, and a surface expression one-side evaluation value which is calculated from the occurrence probabilities or the occurrence frequencies of the n-grams, the replacing portions of which are excluded from judgment, is not less than a predetermined threshold, the surface expression judge 28 judges that the paraphrastic sentence is good and outputs a judgment result to the outputter 25.

If the surface expression judge 28 fails to judge that a paraphrastic sentence is good, the part-of-speech expression judge 29 judges whether a part-of-speech expression anterior and posterior portion composed of a replacing portion, an anterior part-of-speech portion obtained by replacing a word anterior to the replacing portion in n-grams with a part of speech of the anterior word, and a posterior part-of-speech portion obtained by replacing a word posterior to the replacing portion in the n-grams with a part of speech of the posterior word is present in the colloquial expression n-gram DB 24. If the part-of-speech expression anterior and posterior portion is present in the colloquial expression n-gram DB 24, and a part-of-speech expression anterior- and posterior-side evaluation value which is calculated from occurrence probabilities or occurrence frequencies of the n-grams, the replacing portions of which are excluded from judgment, is not less than a predetermined threshold, the part-of-speech expression judge 29 judges that the paraphrastic sentence is good and outputs a judgment result to the outputter 25.

The present embodiment uses, for example, the 11 types of parts of speech: verb, adjective, adjective verb, noun, pronoun, adverb, adnominal adjective, conjunction, interjection, auxiliary verb, and postpositional particle. Judgment is performed by replacing each of words anterior and posterior to a replacing portion with one of the 11 types of parts of speech. Note that a part-of-speech classification method is not particularly limited to the above-described example. The category of pronoun may be omitted or the category of proper noun may be added.

If the surface expression judge 28 fails to judge that the paraphrastic sentence is good, the part-of-speech expression judge 29 also judges whether a part-of-speech expression anterior word portion composed of the replacing portion and the anterior part-of-speech portion obtained by replacing the word anterior to the replacing portion in the n-grams with the part of speech of the anterior word or a part-of-speech expression posterior word portion composed of the replacing portion and the posterior part-of-speech portion obtained by replacing the word posterior to the replacing portion in the n-grams with the part of speech of the posterior word is present in the colloquial expression n-gram DB 24. If the part-of-speech expression anterior word portion or the part-of-speech expression posterior word portion is present in the colloquial expression n-gram DB 24, and a part-of-speech expression one-side evaluation value which is calculated from the occurrence probabilities or the occurrence frequencies of the n-grams, the replacing portions of which are excluded from judgment, is not less than a predetermined threshold, the part-of-speech expression judge 29 judges that the paraphrastic sentence is good and outputs a judgment result to the outputter 25.

If the part-of-speech expression judge 29 fails to judge that a paraphrastic sentence is good, the replacing portion judge 30 judges whether a replacing portion is present in the colloquial expression n-gram DB 24. If the replacing portion is present in the colloquial expression n-gram DB 24, and a replacing portion evaluation value which is calculated from occurrence probabilities or occurrence frequencies of n-grams, the replacing portions of which are excluded from judgment, is not less than a predetermined threshold, the replacing portion judge 30 judges that the paraphrastic sentence is good. On the other hand, if the replacing portion evaluation value is less than the threshold, the replacing portion judge 30 judges that the paraphrastic sentence is bad. The replacing portion judge 30 outputs a judgment result to the outputter 25.

The outputter 25 outputs a judgment result indicating whether a paraphrastic sentence is good or bad, that is, whether the paraphrastic sentence is adopted or rejected to an external device or the like. For example, the outputter 25 may output a paraphrastic sentence judged as good to a similar bilingual corpus, and the similar bilingual corpus may adopt the paraphrastic sentence as a new original sentence.

Note that the configuration of the paraphrastic sentence identification apparatus 2 is not particularly limited to the above-described example, in which each function is constructed by a separate dedicated piece of hardware. One or a plurality of computers or a server (an information processing apparatus) including a central processing unit (CPU), a read only memory (ROM), a random access memory (RAM), an auxiliary storage device, and the like may have an installed paraphrastic sentence identification program for executing the above-described processing and be configured to function as a paraphrastic sentence identification apparatus. The general-purpose n-gram DB 22 and the colloquial expression n-gram DB 24 are not particularly limited to the example, in which the general-purpose n-gram DB 22 and the colloquial expression n-gram DB 24 are provided inside the paraphrastic sentence identification apparatus 2. The general-purpose n-gram DB 22 and the colloquial expression n-gram DB 24 may be provided in an external server or the like, and the paraphrastic sentence identification apparatus 2 may acquire necessary information over a predetermined network.

A paraphrastic sentence identification process by the paraphrastic sentence identification apparatus 2 with the above-described configuration will next be described in detail. The paraphrastic sentence identification process by the paraphrastic sentence identification apparatus 2 is composed of general-purpose n-gram judgment processing by the general-purpose n-gram judge 21 and colloquial expression n-gram judgment processing by the colloquial expression n-gram judge 23.

Figure 6:
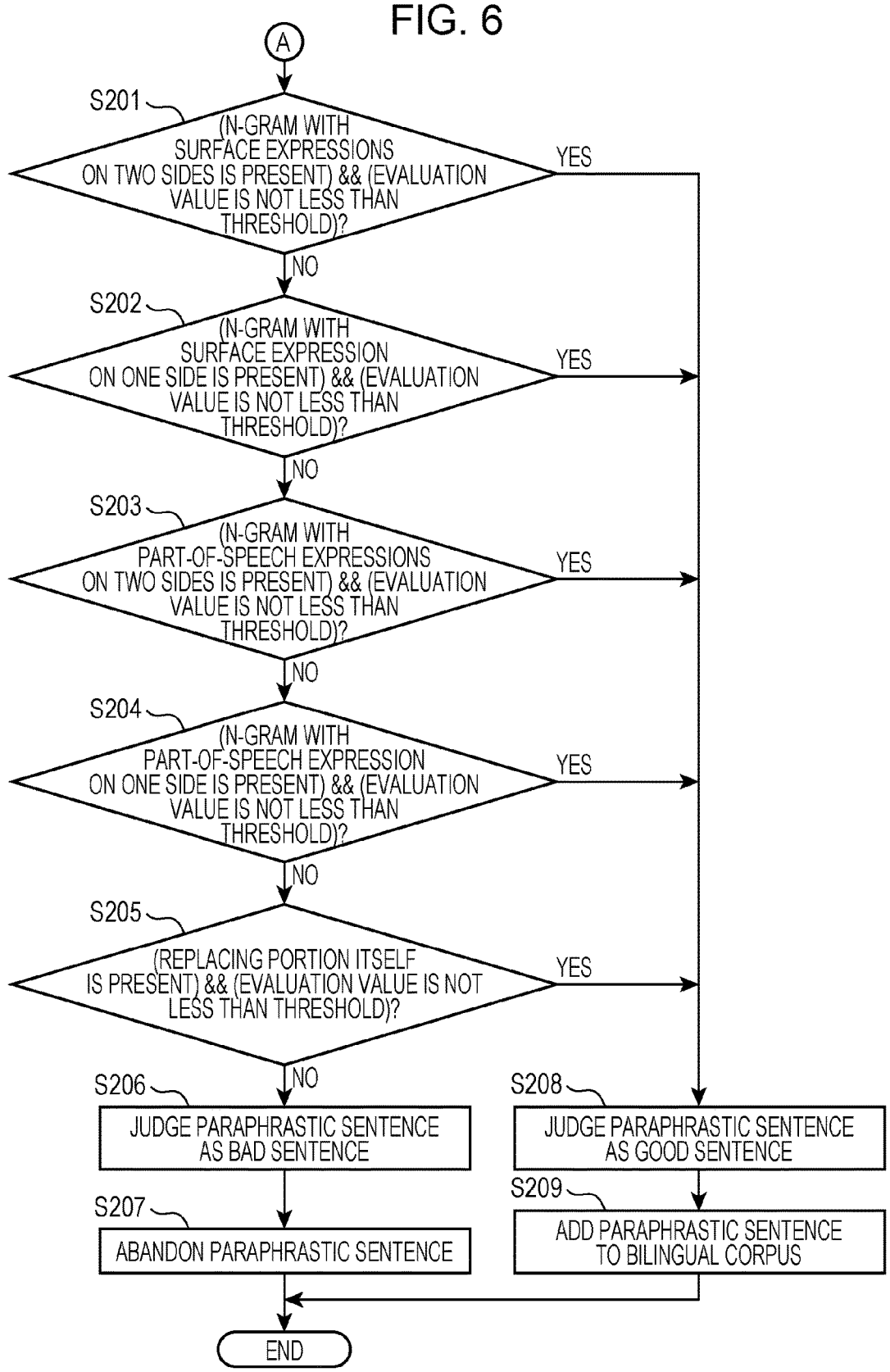
FIG. 6 is a flowchart showing an example of colloquial expression n-gram judgment processing by a colloquial expression n-gram judge shown in FIG. 1.

FIG. 5 is a flowchart showing an example of the general-purpose n-gram judgment processing by the general-purpose n-gram judge 21 shown in FIG. 1. FIG. 6 is a flowchart showing an example of the colloquial expression n-gram judgment processing by the colloquial expression n-gram judge 23 shown in FIG. 1. Note that although various evaluation values are calculated using an occurrence probability in the process below, the present disclosure is not particularly limited to the example. For example, an occurrence frequency may be used.

First, in step S101, the first judge 26 of the general-purpose n-gram judge 21 acquires a paraphrastic sentence from the paraphraser 12 and acquires general-purpose n-grams including a replacing portion from the general-purpose n-gram DB 22. As described above, a paraphrastic sentence (a third sentence) obtained by replacing a first phrase among a plurality of phrases constituting an original sentence (a first sentence) with a replacing portion (a second phrase) is input to the paraphrastic sentence identification apparatus 2.

For example, assume that the original sentence is "sono fuku totemo yoi ne", "totemo" of the original sentence is paraphrased into "metcha", "sono fuku metcha yoi ne" is input as the paraphrastic sentence, and that a 3-gram when n (a positive integer) of an n-gram is set to 3 is adopted. In this case, the first judge 26 divides "sono fuku metcha yoi ne" into "sono", "fuku", "metcha", "yoi", and "ne" and acquires occurrence probabilities of 3-grams having "metcha" as the replacing portions from the general-purpose n-gram DB 22.

Assume that "sono" is represented by W1, "fuku" is represented by W2, "metcha" is represented by W3, "yoi" is represented by W4, and "ne" is represented by W5. The first judge 26 acquires, from the general-purpose n-gram DB 22, an occurrence probability R1 of "W1 W2 W3", an occurrence probability R2 of "W2 W3 W4", and an occurrence probability R3 of "W3 W4 W5" as the occurrence probabilities of the 3-grams including the replacing portions W3.

In step S102, the first judge 26 judges, from the occurrence probabilities of the n-grams including the replacing portions, whether any of the n-grams including the replacing portions is present in the general-purpose n-gram DB 22. For example, if R1=0, R2=0, and R3=0, the first judge 26 judges that none of the 3-grams including the replacing portions W3 is present in the general-purpose n-gram DB 22 and shifts the process to step S103. If at least one of R1, R2, and R3 has a numeral value other than 0, the first judge 26 judges that any of the 3-grams including the replacing portions W3 is present in the general-purpose n-gram DB 22 and shifts the process to step S107.

As described above, in step S102, the first judge 26 judges whether any of the n-grams (third phrases) including the replacing portions that serves as a judgment object portion is included in the general-purpose n-gram DB 22 (the first database). Each n-gram (the third phrase) including the replacing portion includes at least the replacing portion (the second phrase) and a fourth phrase immediately anterior to the replacing portion (the second phrase) in the paraphrastic sentence (the third sentence) or the replacing portion (the second phrase) and a fifth phrase immediately posterior to the replacing portion (the second phrase) in the paraphrastic sentence (the third sentence).

Note that a criterion of judgment as to whether any of the n-grams including the replacing portions is present in the general-purpose n-gram DB 22 is not particularly limited to the above-described example. For example, an average value of or a maximum value among the occurrence probabilities may be compared with a predetermined threshold, and it may be judged that any of the n-grams including the replacing portions is present in the general-purpose n-gram DB 22 if the average value or the maximum value is not less than the predetermined threshold. As described above, an n-word n-gram including the replacing portion (the second phrase) may be used as each n-gram (the third phrase) including the replacing portion that serves as a judgment object portion, the general-purpose n-gram DB 22 may be used as the first database, the occurrence probabilities or occurrence frequencies of the n-grams may be obtained from the general-purpose n-gram DB 22, and the paraphrastic sentence (the third sentence) and a translated sentence (a second sentence) as a pair may be added to the bilingual corpus if an evaluation value calculated from the occurrence probabilities or the occurrence frequencies of the n-grams are not less than the predetermined threshold.

If any of the n-grams including the replacing portions is present in the general-purpose n-gram DB 22 (YES in step S102), the first judge 26 judges in step S107 whether occurrence probabilities or occurrence frequencies in the general-purpose n-gram DB 22 are not less than a predetermined threshold.

If the occurrence probabilities or the occurrence frequencies in the general-purpose n-gram DB 22 are less than the predetermined threshold (NO in step S107), the first judge 26 judges, only for the general-purpose n-gram DB 22, that the paraphrastic sentence is bad (a bad sentence) and outputs a judgment result to the outputter 25 in step S108. In step S109, the outputter 25 abandons the paraphrastic sentence judged as bad (a bad sentence) and ends the process.

As described above, if it is judged that none of the n-grams (the third phrases) including the replacing portions is included in the general-purpose n-gram DB 22 (the first database), the first judge 26 excludes, from judgment, a wildcard (a sixth phrase) of a judgment object portion (a seventh phrase) obtained by excluding each replacing portion from judgment and judges whether any of the judgment object portions (the seventh phrases), the replacing portions of which are excluded from judgment, is present in the general-purpose n-gram DB 22 (the first database). If none of the judgment object portions (the seventh phrases), the replacing portions of which are excluded from judgment, is present in the general-purpose n-gram DB 22 (the first database), the first judge 26 does not add the paraphrastic sentence (the third sentence) to the bilingual corpus.

A specific example will be illustrated. Assume that the bilingual corpus has "sono fuku totemo yoi ne" in Japanese and "That clothes are very good" in English. Also, assume that "totemo" in the original sentence is paraphrased into "hijoni" and that the sentence "sono fuku hijoni yoi ne" is generated as a paraphrastic sentence. If the paraphrastic sentence is judged as bad (a bad sentence) at the time of good/bad judgment, "sono fuku hijoni yoi ne" in Japanese and "That clothes are very good" in English are not added to the bilingual corpus and are abandoned.

On the other hand, if the occurrence probabilities or the occurrence frequencies in the general-purpose n-gram DB 22 are not less than the predetermined threshold (YES in step S107), the first judge 26 judges, only for the general-purpose n-gram DB 22, that the paraphrastic sentence is good (a good sentence) and outputs a judgment result to the outputter 25 in step S110. In step S111, the outputter 25 pairs the paraphrastic sentence judged as good (a good sentence) with a corresponding translated sentence (a translated sentence in English if the generated paraphrastic sentence is in Japanese), adds the pair as a new pair to the bilingual corpus, and ends the process.

A specific example will be illustrated. Assume that the bilingual corpus has "sono fuku totemo yoi ne" in Japanese and "That clothes are very good" in English. Also, assume that "totemo" in the original sentence is paraphrased into "hijoni" and that the sentence "sono fuku hijoni yoi ne" is generated as a paraphrastic sentence. If the paraphrastic sentence is judged as good (a good sentence) at the time of good/bad judgment, "sono fuku hijoni yoi ne" in Japanese and "That clothes are very good" in English are added as a new pair to the bilingual corpus.

Note that although the first judge 26 judges whether a paraphrastic sentence is good through judgment using a threshold for an occurrence probability or the like in the general-purpose n-gram DB 22 in the above-described example, the present disclosure is not particularly limited to the example. The first judge 26 may judge, only for the general-purpose n-gram DB 22, that a paraphrastic sentence is good and add the paraphrastic sentence to the bilingual corpus. Although a positive judgment result or a negative judgment result is output as a judgment result in the present embodiment, the present disclosure is not particularly limited to the example. Whether a paraphrastic sentence is good may be judged by outputting a judgment result as a numerical value.

On the other hand, if none of the n-grams including the replacing portions is present in the general-purpose n-gram DB 22 (NO in step S102), the second judge 27 acquires occurrence probabilities of the n-grams, the replacing portions of which are represented as a wildcard (any number of characters), from the general-purpose n-gram DB 22 in step S103. For example, assuming that the wildcard is represented by "*", the second judge 27 acquires an occurrence probability Q1 of "W1 W2 *", an occurrence probability Q2 of "W2 * W4", and an occurrence probability Q3 of "* W4 W5" from the general-purpose n-gram DB 22.

In step S104, the second judge 27 judges, from the occurrence probabilities of the n-grams, the replacing portions of which are represented as the wildcard, whether any of the n-grams, the replacing portions of which are represented as the wildcard, is present in the general-purpose n-gram DB 22. For example, if Q1=0, Q2=0, and Q3=0, the second judge 27 judges that none of the 3-grams, the replacing portions W3 of which are represented as the wildcard, is present in the general-purpose n-gram DB 22 and shifts the process to step S106. If at least one of Q1, Q2, and Q3 has a numeral value other than 0, the second judge 27 judges that any of the 3-grams, the replacing portions W3 of which are represented as the wildcard, is present in the general-purpose n-gram DB 22 and shifts the process to step S105.

Note that a criterion of judgment as to whether any of the n-grams, the replacing portions of which are represented as the wildcard, is present in the general-purpose n-gram DB 22 is not particularly limited to the above-described example. For example, an average value of or a maximum value among the occurrence probabilities may be compared with a predetermined threshold, and it may be judged that any of the n-grams, the replacing portions of which are represented as the wildcard, is present in the general-purpose n-gram DB 22 if the average value or the maximum value is not less than the predetermined threshold.

If none of the n-grams, the replacing portions of which are represented as the wildcard, is present in the general-purpose n-gram DB 22 (NO in step S104), the second judge 27 judges, only for the general-purpose n-gram DB 22, that the paraphrastic sentence is bad (a bad sentence) and outputs a judgment result to the outputter 25 in step S106. In step S109, the outputter 25 abandons the paraphrastic sentence judged as bad (a bad sentence) and ends the process.

On the other hand, if any of the n-grams, the replacing portions of which are represented as the wildcard, is present in the general-purpose n-gram DB 22 (YES in step S104), the second judge 27 acquires occurrence probabilities of the n-grams, the replacing portions of which are represented as the wildcard, from the general-purpose n-gram DB 22 and calculates, as a value for a general-purpose n-gram (a non-judgment-object evaluation value), a wildcard occurrence probability Q from the occurrence probabilities or occurrence frequencies of the n-grams, the replacing portions of which are excluded from judgment, in step S105. The second judge 27 outputs the wildcard occurrence probability Q to the colloquial expression n-gram judge 23 and shifts the process to step S201 shown in FIG. 6.

For example, the second judge 27 obtains an average value of or a maximum value among the occurrence probabilities (for example, an average value of or a maximum value among the occurrence probabilities Q1 to Q3) of the n-grams, the replacing portions of which are represented as the wildcard, and sets the wildcard occurrence probability Q to the obtained average value or maximum value. If an occurrence probability of "sono fuku *" is 0.05, an occurrence probability of "fuku * yoi" is 0.12, and an occurrence probability of "* yoi ne" is 0.45 in the example using 3-grams, the second judge 27 calculates an average value of the occurrence probabilities as the wildcard occurrence probability Q. Note that the wildcard occurrence probability Q is not particularly limited to the average value or the maximum value and may be any other value, such as a median value.

As described above, the wildcard occurrence probability Q (a first evaluation value) in the general-purpose n-gram DB 22 (the first database) is calculated for the judgment object portions (the seventh phrases), the replacing portions of which are excluded from judgment, the judgment object portions being obtained by replacing the replacing portions (the second phrases) of the n-grams (the third phrases) including the replacing portions with the wildcard (the sixth phrase). The wildcard (the sixth phrase) is different from each replacing portion (the second phrase).

Referring to FIG. 6, in step S201, the surface expression judge 28 of the colloquial expression n-gram judge 23 acquires the wildcard occurrence probability Q from the second judge 27 and judges whether a colloquial expression n-gram with surface expressions near and on two sides of the replacing portion is present in the colloquial expression n-gram DB 24 and whether the surface expression anterior- and posterior-side evaluation value obtained by adding a predetermined weight to the wildcard occurrence probability Q is not less than a predetermined threshold.

More specifically, the surface expression judge 28 checks whether a surface expression anterior and posterior portion composed of the replacing portion and words anterior and posterior to the replacing portion is present as a colloquial expression n-gram with surface expressions near and on the two sides of the replacing portion in the colloquial expression n-gram DB 24. If the surface expression anterior and posterior portion is present in the colloquial expression n-gram DB 24, the surface expression judge 28 obtains the surface expression anterior- and posterior-side evaluation value by multiplexing the wildcard occurrence probability Q by a weighting factor v1 and judges whether the surface expression anterior- and posterior-side evaluation value is not less than a threshold t1.

For example, if the replacing portion is W3, the surface expression judge 28 checks whether the phrase "W2 W3 W4" (including the two sides of the replacing portion) is present in the colloquial expression n-gram DB 24. If "W2 W3 W4" is present in the colloquial expression n-gram DB 24, the surface expression judge 28 checks whether the surface expression anterior- and posterior-side evaluation value obtained by multiplying the wildcard occurrence probability Q (for example, 0.26) by the weighting factor v1 (for example, 0.9) is not less than the threshold t1 (for example, 0.15). In this case, since the surface expression anterior- and posterior-side evaluation value is 0.234, the surface expression judge 28 judges that the surface expression anterior- and posterior-side evaluation value is not less than the threshold t1.

If a colloquial expression n-gram with surface expressions near and on the two sides of the replacing portion is present in the colloquial expression n-gram DB 24, and the surface expression anterior- and posterior-side evaluation value obtained by adding the predetermined weight to the wildcard occurrence probability Q is not less than the predetermined threshold (YES in step S201), the surface expression judge 28 judges that the paraphrastic sentence is good (a good sentence) and outputs a judgment result to the outputter 25 in step S208. In step S209, the outputter 25 pairs the paraphrastic sentence judged as good (a good sentence) and a corresponding translated sentence (a translated sentence in English if the generated paraphrastic sentence is in Japanese), adds the pair as a new pair to the bilingual corpus, and ends the process.

A specific example will be illustrated. Assume that the bilingual corpus has "sono fuku totemo yoi ne" in Japanese and "That clothes are very good" in English. Also, assume that "totemo" in the original sentence is paraphrased into "hijoni" and that the sentence "sono fuku hijoni yoi ne" is generated as a paraphrastic sentence. If the paraphrastic sentence is judged as good (a good sentence) at the time of good/bad judgment, "sono fuku hijoni yoi ne" in Japanese and "That clothes are very good" in English are added as a new pair to the bilingual corpus.

On the other hand, if no colloquial expression n-gram with surface expressions near and on the two sides of the replacing portion is present in the colloquial expression n-gram DB 24 or if the surface expression anterior- and posterior-side evaluation value obtained by adding the predetermined weight to the wildcard occurrence probability Q is less than the predetermined threshold (NO in step S201), the surface expression judge 28 shifts the process to step S202.

In step S202, the surface expression judge 28 judges whether a colloquial expression n-gram with a surface expression near and on one side of the replacing portion is present in the colloquial expression n-gram DB 24 and whether the surface expression one-side evaluation value obtained by adding a predetermined weight to the wildcard occurrence probability Q is not less than a predetermined threshold.

More specifically, the surface expression judge 28 checks whether a surface expression anterior word portion composed of the replacing portion and a word anterior to the replacing portion or a surface expression posterior word portion composed of the replacing portion and a word posterior to the replacing portion is present as a colloquial expression n-gram with a surface expression near and on one side of the replacing portion in the colloquial expression n-gram DB 24. If the surface expression anterior word portion or the surface expression posterior word portion is present in the colloquial expression n-gram DB 24, the surface expression judge 28 obtains the surface expression one-side evaluation value obtained by multiplexing the wildcard occurrence probability Q by a weighting factor v2 and judges whether the surface expression one-side evaluation value is not less than the threshold t1. The weighting factor v2 is preferably less than the weighting factor v1.

For example, if the replacing portion is W3, the surface expression judge 28 checks whether the phrase "W2 W3" or "W3 W4" (including one side of the replacing portion) is present in the colloquial expression n-gram DB 24. If "W2 W3" or "W3 W4" is present in the colloquial expression n-gram DB 24, the surface expression judge 28 checks whether the surface expression one-side evaluation value obtained by multiplexing the wildcard occurrence probability Q (for example, 0.26) by the weighting factor v2 (for example, 0.8) is not less than the threshold t1 (for example, 0.15). In this case, since the surface expression one-side evaluation value is 0.208, the surface expression judge 28 judges that the surface expression one-side evaluation value is not less than the threshold t1.

If a colloquial expression n-gram with a surface expression near and on one side of the replacing portion is present in the colloquial expression n-gram DB 24, and the surface expression one-side evaluation value obtained by adding the predetermined weight to the wildcard occurrence probability Q is not less than the predetermined threshold (YES in step S202), the surface expression judge 28 judges that the paraphrastic sentence is good (a good sentence) and outputs a judgment result to the outputter 25 in step S208. In step S209, the outputter 25 pairs the paraphrastic sentence judged as good (a good sentence) and a corresponding translated sentence (a translated sentence in English if the generated paraphrastic sentence is in Japanese), adds the pair as a new pair to the bilingual corpus, and ends the process.

As described above, the surface expression judge 28 judges whether a judgment object portion (a third phrase) is included in the colloquial expression n-gram DB 24 (the second database) and judges whether the surface expression anterior- and posterior-side evaluation value or the surface expression one-side evaluation value (a second evaluation value) that is calculated on the basis of the wildcard occurrence probability Q (the first evaluation value) satisfies a predetermined condition. If it is judged that a judgment object portion (a third phrase) is included in the colloquial expression n-gram DB 24 (the second database) and that the surface expression anterior- and posterior-side evaluation value or the surface expression one-side evaluation value (the second evaluation value) satisfies the predetermined condition, the surface expression judge 28 adds the paraphrastic sentence (the third sentence) and a translated sentence (a second sentence) as a pair to the bilingual corpus.

On the other hand, if no colloquial expression n-gram with a surface expression near and on one side of the replacing portion is present in the colloquial expression n-gram DB 24 or if the surface expression one-side evaluation value obtained by adding the predetermined weight to the wildcard occurrence probability Q is less than the predetermined threshold (NO in step S202), the surface expression judge 28 shifts the process to step S203.

In step S203, the part-of-speech expression judge 29 of the colloquial expression n-gram judge 23 acquires the wildcard occurrence probability Q from the second judge 27 and judges whether a colloquial expression n-gram with part-of-speech expressions near and on the two sides of the replacing portion is present in the colloquial expression n-gram DB 24 and whether the part-of-speech expression anterior- and posterior-side evaluation value obtained by adding a predetermined weight to the wildcard occurrence probability Q is not less than a predetermined threshold.

More specifically, the part-of-speech expression judge 29 checks whether a part-of-speech expression anterior and posterior portion composed of the replacing portion, an anterior part-of-speech portion obtained by replacing a word anterior to the replacing portion with a part of speech, and a posterior part-of-speech portion obtained by replacing a word posterior to the replacing portion with a part of speech is present as a colloquial expression n-gram with part-of-speech expressions near and on the two sides of the replacing portion in the colloquial expression n-gram DB 24. If the part-of-speech expression anterior and posterior portion is present in the colloquial expression n-gram DB 24, the part-of-speech expression judge 29 obtains the part-of-speech expression anterior- and posterior-side evaluation value by multiplying the wildcard occurrence probability Q by a weighting factor v3 and judges whether the part-of-speech expression anterior- and posterior-side evaluation value is not less than the threshold t1. The weighting factor v3 is preferably less than the weighting factor v2.

For example, assume that a part of speech of W1 is represented by P1, a part of speech of W2 is represented by P2, a part of speech of W3 is represented by P3, a part of speech of W4 is represented by P4, and a part of speech of W5 is represented by P5. If the replacing portion is W3, the part-of-speech expression judge 29 checks whether the phrase "P2 W3 P4" (including the two sides of the replacing portion) is present in the colloquial expression n-gram DB 24. If 37 P2 W3 P4" is present in the colloquial expression n-gram DB 24, the part-of-speech expression judge 29 checks whether the part-of-speech expression anterior- and posterior-side evaluation value obtained by multiplying the wildcard occurrence probability Q (for example, 0.26) by the weighting factor v3 (for example, 0.7) is not less than the threshold t1 (for example, 0.15). In this case, since the part-of-speech expression anterior- and posterior-side evaluation value is 0.182, the part-of-speech expression judge 29 judges that the part-of-speech expression anterior- and posterior-side evaluation value is not less than the threshold t1.

If a colloquial expression n-gram with part-of-speech expressions near and on the two sides of the replacing portion is present in the colloquial expression n-gram DB 24, and the part-of-speech expression anterior- and posterior-side evaluation value obtained by adding the predetermined weight to the wildcard occurrence probability Q is not less than the predetermined threshold (YES in step S203), the part-of-speech expression judge 29 judges that the paraphrastic sentence is good (a good sentence) and outputs a judgment result to the outputter 25 in step S208. In step S209, the outputter 25 pairs the paraphrastic sentence judged as good (a good sentence) and a corresponding translated sentence (a translated sentence in English if the generated paraphrastic sentence is in Japanese), adds the pair as a new pair to the bilingual corpus, and ends the process.

On the other hand, if no colloquial expression n-gram with part-of-speech expressions near and on the two sides of the replacing portion is present in the colloquial expression n-gram DB 24 or if the part-of-speech expression anterior- and posterior-side evaluation value obtained by adding the predetermined weight to the wildcard occurrence probability Q is less than the predetermined threshold (NO in step S203), the part-of-speech expression judge 29 shifts the process to step S204.

In step S204, the part-of-speech expression judge 29 judges whether a colloquial expression n-gram with a part-of-speech expression near and on one side of the replacing portion is present in the colloquial expression n-gram DB 24 and whether the part-of-speech expression one-side evaluation value obtained by adding a predetermined weight to the wildcard occurrence probability Q is not less than a predetermined threshold.

More specifically, the part-of-speech expression judge 29 checks whether a part-of-speech expression anterior word portion composed of the replacing portion and an anterior part-of-speech portion obtained by replacing a word anterior to the replacing portion with a part of speech or a part-of-speech expression posterior word portion composed of the replacing portion and a posterior part-of-speech portion obtained by replacing a word posterior to the replacing portion with a part of speech is present as a colloquial expression n-gram with a part-of-speech expression near and on one side of the replacing portion in the colloquial expression n-gram DB 24. If the part-of-speech expression anterior word portion or the part-of-speech expression posterior word portion is present in the colloquial expression n-gram DB 24, the part-of-speech expression judge 29 obtains the part-of-speech expression one-side evaluation value by multiplying the wildcard occurrence probability Q by a weighting factor v4 and judges whether the part-of-speech expression one-side evaluation value is not less than the threshold t1. The weighting factor v4 is preferably less than the weighting factor v3.

For example, if the replacing portion is W3, the part-of-speech expression anterior to the replacing portion is P2, and the part-of-speech expression posterior to the replacing portion is P4, the part-of-speech expression judge 29 checks whether the phrase "P2 W3" or "W3 P4" (including one side of the replacing portion) is present in the colloquial expression n-gram DB 24. If "P2 W3" or "W3 P4" is present in the colloquial expression n-gram DB 24, the part-of-speech expression judge 29 checks whether the part-of-speech expression one-side evaluation value obtained by multiplying the wildcard occurrence probability Q (for example, 0.26) by the weighting factor v4 (for example, 0.6) is not less than the threshold t1 (for example, 0.15). In this case, since the part-of-speech expression one-side evaluation value is 0.156, the part-of-speech expression judge 29 judges that the part-of-speech expression one-side evaluation value is not less than the threshold t1.

If a colloquial expression n-gram with a part-of-speech expression near and on one side of the replacing portion is present in the colloquial expression n-gram DB 24, and the part-of-speech expression one-side evaluation value obtained by adding the predetermined weight to the wildcard occurrence probability Q is not less than the predetermined threshold (YES in step S204), the part-of-speech expression judge 29 judges that the paraphrastic sentence is good (a good sentence) and outputs a judgment result to the outputter 25 in step S208. In step S209, the outputter 25 pairs the paraphrastic sentence judged as good (a good sentence) and a corresponding translated sentence (a translated sentence in English if the generated paraphrastic sentence is in Japanese), adds the pair as a new pair to the bilingual corpus, and ends the process.

On the other hand, if no colloquial expression n-gram with a part-of-speech expression near and on one side of the replacing portion is present in the colloquial expression n-gram DB 24 or if the part-of-speech expression one-side evaluation value obtained by adding the predetermined weight to the wildcard occurrence probability Q is less than the predetermined threshold (NO in step S204), the part-of-speech expression judge 29 shifts the process to step S205.

In step S205, the replacing portion judge 30 of the colloquial expression n-gram judge 23 acquires the wildcard occurrence probability Q from the second judge 27 and judges whether the replacing portion itself is present in the colloquial expression n-gram DB 24 and whether the replacing portion evaluation value obtained by adding a predetermined weight to the wildcard occurrence probability Q is not less than a predetermined threshold.

More specifically, the replacing portion judge 30 checks whether the replacing portion is present in the colloquial expression n-gram DB 24. If the replacing portion is present in the colloquial expression n-gram DB 24, the replacing portion judge 30 obtains the replacing portion evaluation value by multiplying the wildcard occurrence probability Q by a weighting factor v5 and judges whether the replacing portion evaluation value is not less than the threshold t1.

For example, if the replacing portion is W3, the replacing portion judge 30 checks whether W3 is present in the colloquial expression n-gram DB 24. If W3 is present in the colloquial expression n-gram DB 24, the replacing portion judge 30 checks whether the replacing portion evaluation value obtained by multiplying the wildcard occurrence probability Q (for example, 0.26) by the weighting factor v5 (for example, 0.5) is not less than the threshold t1 (for example, 0.15). In this case, since the replacing portion evaluation value is 0.13, the replacing portion judge 30 judges that the replacing portion evaluation value is less than the threshold t1.

The weighting factor v5 is preferably less than the weighting factor v4. It is thus preferable that the weighting factor v1>the weighting factor v2>the weighting factor v3>the weighting factor v4>the weighting factor v5. Note that a magnitude relation among the weighting factors is not particularly limited to the above-described example and that any other magnitude relation may be adopted. The way to change each evaluation value is not particularly limited to the weight addition, and various changes may be made. For example, each evaluation value may be obtained as an occurrence frequency or an occurrence probability. The occurrence frequency or the occurrence probability may be judged in combination with a value for a general-purpose n-gram (for example, the wildcard occurrence probability Q). Although judgment is performed by comparing each evaluation value with the threshold t1, a criterion of judgment for each evaluation value is not particularly limited to the example, and various changes may be made. For example, a different threshold may be used for each evaluation value.

If the replacing portion is present in the colloquial expression n-gram DB 24, and the replacing portion evaluation value obtained by adding the predetermined weight to the wildcard occurrence probability Q is not less than the predetermined threshold (YES in step S205), the replacing portion judge 30 judges that the paraphrastic sentence is good (a good sentence) and outputs a judgment result to the outputter 25 in step S208. In step S209, the outputter 25 pairs the paraphrastic sentence judged as good (a good sentence) and a corresponding translated sentence (a translated sentence in English if the generated paraphrastic sentence is in Japanese), adds the pair as a new pair to the bilingual corpus, and ends the process.

On the other hand, if the replacing portion is not present in the colloquial expression n-gram DB 24 or if the replacing portion evaluation value obtained by adding the predetermined weight to the wildcard occurrence probability Q is less than the predetermined threshold (NO in step S205), the replacing portion judge 30 judges that the paraphrastic sentence is bad (a bad sentence) and outputs a judgment result to the outputter 25 in step S206. In step S207, the outputter 25 abandons the paraphrastic sentence judged as bad (a bad sentence) and ends the process.

A specific example will be illustrated. Assume that the bilingual corpus has "sono fuku totemo yoi ne" in Japanese and "That clothes are very good" in English. Also, assume that "totemo" in the original sentence is paraphrased into "hijoni", and the sentence "sono fuku hijoni yoi ne" is generated as a paraphrastic sentence. If the paraphrastic sentence is judged as bad (a bad sentence) at the time of good/bad judgment, "sono fuku hijoni yoi ne" in Japanese and "That clothes are very good" in English are not added to the bilingual corpus and are abandoned.

With the above-described process, the present embodiment is capable of evaluating, in a hybrid manner, whether a paraphrastic sentence is good by efficiently referring to advantages of both the general-purpose n-gram DB 22 that is large in sale and good in quality and the colloquial expression n-gram DB 24, data quality of which is not guaranteed but which includes colloquial expressions, dialectal expressions, and the like. This allows efficient and precise identification of whether a paraphrastic sentence created from an original sentence is good.

Note that although the general-purpose n-gram DB 22 and the colloquial expression n-gram DB 24 are used as databases in the present embodiment, a database to be used is not particularly limited to the example. Various databases can be used. Alternatively, only one database (for example, the general-purpose n-gram DB 22) may be used or three or more types of databases may be used.

The present disclosure can efficiently and precisely identify whether a paraphrastic sentence created from an original sentence is good and is applicable to a paraphrastic sentence identification method, a paraphrastic sentence identification apparatus, and a recording medium storing a paraphrastic sentence identification program for identifying whether a paraphrastic sentence created from an original sentence is good.

What is claimed is:

1. A method for updating a bilingual corpus, the bilingual corpus including a plurality of pairs, each composed of a sentence described in a first language and a translated sentence described in a second language, the bilingual corpus including a first sentence described in the first language and a second sentence described in the second language as a pair, the second sentence being a translated sentence corresponding to the first sentence, the method comprising:
    inputting a third sentence obtained by replacing a first phrase among a plurality of phrases constituting the first sentence with a second phrase;
    judging whether a third phrase is included in a first database, the third phrase including at least the second phrase and a fourth phrase immediately anterior to the second phrase in the third sentence or the second phrase and a fifth phrase immediately posterior to the second phrase in the third sentence, the first database including at least a phrase used in written text;
    calculating, on the basis of the first database, a first evaluation value in the first database for a seventh phrase obtained by replacing the second phrase of the third phrase with a sixth phrase if it is judged that the third phrase is not included in the first database, the sixth phrase being different from the second phrase;
    judging whether the third phrase is included in a second database and judging whether a second evaluation value calculated on the basis of the first evaluation value satisfies a predetermined condition, the second database including at least a phrase used in spoken text, the phrase used in the spoken text being associated with an occurrence frequency in the second database of the phrase used in the spoken text; and
    adding the third sentence and the second sentence as a pair to the bilingual corpus if it is judged that the third phrase is included in the second database and that the second evaluation value satisfies the predetermined condition.

2. The method according to claim 1, wherein
the third sentence is generated by replacing the first phrase with the second phrase included in a third database, and the third database associates a phrase with a phrase identical in meaning to and different in expression from the phrase.

3. The method according to claim 1, wherein
the second database is generated on the basis of a phrase used in a social networking service.

4. The method according to claim 1, further comprising:
adding the third sentence and the second sentence as the pair to the bilingual corpus if it is judged that the third phrase is included in the first database.

5. The method according to claim 1, further comprising:
excluding the sixth phrase of the seventh phrase from judgment and judging whether the seventh phrase is present in the first database if it is judged that the third phrase is not included in the first database, and not adding the third sentence to the bilingual corpus if the seventh phrase is not present in the first database.

6. The method according to claim 5, further comprising:
using an n-word n-gram including the second phrase as the third phrase and a database for an n-gram language model as the first database, judging whether the n-gram is present in the database for the n-gram language model, and adding the third sentence and the second sentence as the pair to the bilingual corpus if the n-gram is present in the database for the n-gram language model.

7. The method according to claim 5, further comprising:
using an n-word n-gram including the second phrase as the third phrase and a database for an n-gram language model as the first database, obtaining an occurrence probability or an occurrence frequency of the n-gram from the database for the n-gram language model, and adding the third sentence and the second sentence as the pair to the bilingual corpus if a third evaluation value calculated from the occurrence probability or the occurrence frequency of the n-gram is not less than a predetermined threshold.

8. The method according to claim 6, further comprising:
judging whether the n-gram, the second phrase of which is excluded from judgment, is present in the database for the n-gram language model if it is judged that the third phrase is not included in the first database, and not adding the third sentence to the bilingual corpus if the n-gram, the second phrase of which is excluded from judgment, is not present in the database for the n-gram language model.

9. The method according to claim 6, further comprising:
obtaining an occurrence probability or an occurrence frequency of the n-gram, the second phrase of which is excluded from judgment, from the database for the n-gram language model if it is judged that the third phrase is not included in the first database, and not adding the third sentence to the bilingual corpus if a fourth evaluation value calculated from the occurrence probability or the occurrence frequency of the n-gram, the second phrase of which is excluded from judgment, is less than a predetermined threshold.

10. The method according to claim 6, further comprising:
judging whether a surface expression anterior and posterior portion composed of the second phrase, the fourth phrase, and the fifth phrase of the n-gram is present in the second database if the seventh phrase is present in the first database, and adding the third sentence and the second sentence as the pair to the bilingual corpus if the surface expression anterior and posterior portion is present in the second database, and a surface expression anterior- and posterior-side evaluation value calculated from an occurrence probability or an occurrence frequency of the n-gram, the second phrase of which is excluded from judgment, is not less than a predetermined threshold.

11. The method according to claim 10, further comprising:
judging whether a surface expression anterior word portion composed of the second phrase and the fourth phrase of the n-gram or a surface expression posterior word portion composed of the second phrase and the fifth phrase is present in the second database if the seventh phrase is present in the first database, and adding the third sentence and the second sentence as the pair to the bilingual corpus if the surface expression anterior word portion or the surface expression posterior word portion is present in the second database, and a surface expression one-side evaluation value calculated from the occurrence probability or the occurrence frequency of the n-gram, the second phase of which is excluded from judgment, is not less than a predetermined threshold.

12. The method according to claim 11, wherein
the surface expression anterior- and posterior-side evaluation value is a value obtained by multiplying the first evaluation value obtained from the occurrence probability or the occurrence frequency of the n-gram, the second phrase of which is excluded from judgment, by a predetermined first weighting factor, and
the surface expression one-side evaluation value is a value obtained by multiplying the first evaluation value by a second weighting factor less than the first weighting factor.

13. The method according to claim 11, further comprising:
judging whether a part-of-speech expression anterior and posterior portion composed of the second phrase of the n-gram, an anterior part-of-speech portion obtained by replacing the fourth phrase with a part of speech of the fourth phrase, and a posterior part-of-speech portion obtained by replacing the fifth phrase with a part of speech of the fifth phrase is present in the second database if the surface expression anterior and posterior portion is not present in the second database, if the surface expression anterior- and posterior-side evaluation value is less than the predetermined threshold, if neither the surface expression anterior word portion nor the surface expression posterior word portion is present in the second database, or if the surface expression one-side evaluation value is less than the predetermined threshold, and adding the third sentence and the second sentence as the pair to the bilingual corpus if the part-of-speech expression anterior and posterior portion is present in the second database, and a part-of-speech expression anterior- and posterior-side evaluation value calculated from the occurrence probability or the occurrence frequency of the n-gram, the second phrase of which is excluded from judgment, is not less than a predetermined threshold.

14. The method according to claim 13, further comprising:
judging whether a part-of-speech expression anterior word portion composed of the second phrase of the n-gram and the anterior part-of-speech portion obtained by replacing the fourth phrase with the part of speech of the fourth phrase or a part-of-speech expression posterior word portion composed of the second phrase and the posterior part-of-speech portion obtained by replacing the fifth phrase with the part of speech of the fifth phrase is present in the second database if the surface expression anterior and posterior portion is not present in the second database, if the surface expression anterior- and posterior-side evaluation value is less than the predetermined threshold, if neither the surface expression anterior word portion nor the surface expression posterior word portion is present in the second database, or if the surface expression one-side evaluation value is less than the predetermined threshold, and adding the third sentence and the second sentence as the pair to the bilingual corpus if the part-of-speech expression anterior word portion or the part-of-speech expression posterior word portion is present in the second database, and a part-of-speech expression one-side evaluation value calculated from the occurrence probability or the occurrence frequency of the n-gram, the replacing portion of which is excluded from judgment, is not less than a predetermined threshold.

15. The method according to claim 14, wherein
the surface expression anterior- and posterior-side evaluation value is a value obtained by multiplying the first evaluation value obtained from the occurrence probability or the occurrence frequency of the n-gram, the second phrase of which is excluded from judgment, by a predetermined first weighting factor,
the surface expression one-side evaluation value is a value obtained by multiplying the first evaluation value by a second weighting factor less than the first weighting factor,
the part-of-speech expression anterior- and posterior-side evaluation value is a value obtained by multiplying the first evaluation value by a third weighting factor less than the second weighting factor, and
the part-of-speech expression one-side evaluation value is a value obtained by multiplying the first evaluation value by a fourth weighting factor less than the third weighting factor.

16. The method according to claim 14, further comprising:
judging whether the second phrase is present in the second database if the part-of-speech expression anterior and posterior portion is not present in the second database, if the part-of-speech expression anterior- and posterior-side evaluation value is less than the predetermined threshold, if neither the part-of-speech expression anterior word portion nor the part-of-speech expression posterior word portion is present in the second database, or if the part-of-speech expression one-side evaluation value is less than the predetermined threshold, and adding the third sentence and the second sentence as the pair to the bilingual corpus if the second phrase is present in the second database, and a replacing portion evaluation value calculated from the occurrence probability or the occurrence frequency of the n-gram, the second phrase of which is excluded from judgment, is not less than a predetermined threshold.

17. The method according to claim 16, wherein
the surface expression anterior- and posterior-side evaluation value is a value obtained by multiplying the first evaluation value obtained from the occurrence probability or the occurrence frequency of the n-gram, the second phrase of which is excluded from judgment, by a predetermined first weighting factor,
the surface expression one-side evaluation value is a value obtained by multiplying the first evaluation value by a second weighting factor less than the first weighting factor,
the part-of-speech expression anterior- and posterior-side evaluation value is a value obtained by multiplying the first evaluation value by a third weighting factor less than the second weighting factor,
the part-of-speech expression one-side evaluation value is a value obtained by multiplying the first evaluation value by a fourth weighting factor less than the third weighting factor, and
the replacing portion evaluation value is a value obtained by multiplying the first evaluation value by a fifth weighting factor less than the fourth weighting factor.

18. The method according to claim 10, wherein
the second database is a database which includes more colloquial expressions than the database for the n-gram language model.

19. An apparatus for updating a bilingual corpus, the bilingual corpus including a plurality of pairs, each composed of a sentence described in a first language and a translated sentence described in a second language, the bilingual corpus including a first sentence described in the first language and a second sentence described in the second language as a pair, the second sentence being a translated sentence corresponding to the first sentence, the apparatus comprising:
  an inputter which inputs a third sentence obtained by replacing a first phrase among a plurality of phrases constituting the first sentence with a second phrase;
  a first database judge which judges whether a third phrase is included in a first database, the third phrase including at least the second phrase and a fourth phrase immediately anterior to the second phrase in the third sentence or the second phrase and a fifth phrase immediately posterior to the second phrase in the third sentence, the first database including at least a phrase used in written text;
  a calculator which calculates, on the basis of the first database, a first evaluation value in the first database for a seventh phrase obtained by replacing the second phrase of the third phrase with a sixth phrase if it is judged that the third phrase is not included in the first database, the sixth phrase being different from the second phrase;
  a second database judge which judges whether the third phrase is included in a second database and judges whether a second evaluation value calculated on the basis of the first evaluation value satisfies a predetermined condition, the second database including at least a phrase used in spoken text, the phrase used in the spoken text being associated with an occurrence frequency in the second database of the phrase used in the spoken text; and
  an outputter which adds the third sentence and the second sentence as a pair to the bilingual corpus if it is judged that the third phrase is included in the second database and that the second evaluation value satisfies the predetermined condition.

20. A Non-transitory recording medium storing a program for causing a computer to function as an apparatus for updating a bilingual corpus,
  the bilingual corpus including a plurality of pairs, each composed of a sentence described in a first language and a translated sentence described in a second language, the bilingual corpus including a first sentence described in the first language and a second sentence described in the second language as a pair,
  the second sentence being a translated sentence corresponding to the first sentence, the program causing the computer to execute:
  inputting a third sentence obtained by replacing a first phrase among a plurality of phrases constituting the first sentence with a second phrase;
  judging whether a third phrase is included in a first database, the third phrase including at least the second phrase and a fourth phrase immediately anterior to the second phrase in the third sentence or the second phrase and a fifth phrase immediately posterior to the second phrase in the third sentence, the first database including at least a phrase used in written text;
  calculating, on the basis of the first database, a first evaluation value in the first database for a seventh phrase obtained by replacing the second phrase of the third phrase with a sixth phrase if it is judged that the third phrase is not included in the first database, the sixth phrase being different from the second phrase;
  judging whether the third phrase is included in a second database and judging whether a second evaluation value calculated on the basis of the first evaluation value satisfies a predetermined condition,
  the second database including at least a phrase used in spoken text, the phrase used in the spoken text being associated with an occurrence frequency in the second database of the phrase used in the spoken text;
  and adding the third sentence and the second sentence as a pair to the bilingual corpus if it is judged that the third phrase is included in the second database and that the second evaluation value satisfies the predetermined condition.

* * * * *